US012742903B2

(12) United States Patent
Liu et al.

(10) Patent No.: US 12,742,903 B2
(45) Date of Patent: Sep. 22, 2026

(54) CAPROCK ANALYSIS METHODS AND SYSTEMS

(71) Applicant: Saudi Arabian Oil Company, Dhahran (SA)

(72) Inventors: Hui-Hai Liu, Houston, TX (US); Jilin Jay Zhang, Houston, TX (US)

(73) Assignee: Saudi Arabian Oil Company, Dhahran (SA)

(*) Notice: Subject to any disclaimer, the term of this patent is extended or adjusted under 35 U.S.C. 154(b) by 493 days.

(21) Appl. No.: 18/455,847

(22) Filed: Aug. 25, 2023

(65) Prior Publication Data

US 2025/0067892 A1 Feb. 27, 2025

(51) Int. Cl.

| | |
|---|---|
| ***G06F 11/30*** | (2006.01) |
| ***G01N 13/00*** | (2006.01) |
| ***G01N 15/08*** | (2006.01) |
| ***G01V 1/50*** | (2006.01) |
| *E21B 41/00* | (2006.01) |

(52) U.S. Cl.

CPC ............... *G01V 1/50* (2013.01); *G01N 13/00* (2013.01); *G01N 15/0826* (2013.01); *E21B 41/0064* (2013.01)

(58) Field of Classification Search

CPC ........................................................ G01V 1/50

See application file for complete search history.

(56) References Cited

U.S. PATENT DOCUMENTS

| | | | | |
|---|---|---|---|---|
| 7,726,402 | B2 | 6/2010 | Ramakrishnan et al. | |
| 8,454,268 | B2 | 6/2013 | Wilkinson | |
| 11,353,621 | B2 | 6/2022 | Khan et al. | |
| 2015/0267527 | A1* | 9/2015 | Nguyen | G01V 3/20 702/12 |
| 2019/0212460 | A1* | 7/2019 | Zhao | G01V 1/302 |
| 2020/0284945 | A1* | 9/2020 | Khan | G08B 5/22 |
| 2023/0184614 | A1 | 6/2023 | Zhang et al. | |

OTHER PUBLICATIONS

Gao et al., "Cap rock $CO_2$ breakthrough pressure measurement apparatus and application in Shenhua CCS project," Energy Procedia, 2014, 63:4766-4772, 7 pages.

Teng et al., "Temperature effect on non-Darcian flow in low-permeability porous media," Arxiv, Aug. 2022, 16 pages.

Yarushina et al., "Potential leakage mechanisms and their relevance to $CO_2$ storage site risk assessment and safe operations," FME Success, Synthesis report vol. 2, Mar. 2018, 32 pages.

* cited by examiner

*Primary Examiner* — Phuong Huynh

(74) *Attorney, Agent, or Firm* — Fish & Richardson P.C.

(57) ABSTRACT

A method of analyzing a caprock of an aquifer includes determining, using a laboratory measurement device, a threshold hydraulic gradient of the caprock at which brine flows vertically in the caprock. The method further includes determining a breakthrough pressure of the caprock, wherein the breakthrough pressure reflects a difference between a $CO_2$ pressure in the aquifer and a brine pressure in the caprock. The method further includes calculating, via a computing system that includes one or more hardware processors, an effective breakthrough pressure of the caprock based on the threshold hydraulic gradient and the breakthrough pressure, wherein the effective breakthrough pressure accounts for non-Darcy flow of the brine within the caprock.

8 Claims, 4 Drawing Sheets

CAPROCK ANALYSIS METHODS AND SYSTEMS

TECHNICAL FIELD

This disclosure relates to methods and systems for analyzing a caprock by accounting for non-Darcy flow behavior.

BACKGROUND

An important aspect of safely storing carbon dioxide ($CO_2$) in saline aquifers is caprock integrity. For example, to safely store fluids within a selected storage site (e.g., a selected aquifer), a caprock should seal the stored fluids throughout a lifetime of the site. Therefore, accurate assessment of the caprock integrity should be performed during selection of the site, characterization of the site, and operations carried out at the site. Caprock integrity is typically evaluated based on the assumption that brine flow within a caprock follows Darcy's law. However, Darcy flow does not accurately reflect the true behavior of brine within caprocks.

SUMMARY

This disclosure relates to methods and systems for analyzing a caprock by accounting for non-Darcy flow behavior. In some implementations, an integrity of the caprock may be evaluated by determining an effective breakthrough pressure of the caprock based on a threshold hydraulic gradient. Determining the effective breakthrough pressure enables an accurate assessment of the integrity of the caprock for optimal storage of fluids within an aquifer.

The details of one or more embodiments are set forth in the accompanying drawings and description. Other features, aspects, and advantages of the embodiments will become apparent from the description, drawings, and claims.

DETAILED DESCRIPTION

Figure 1:
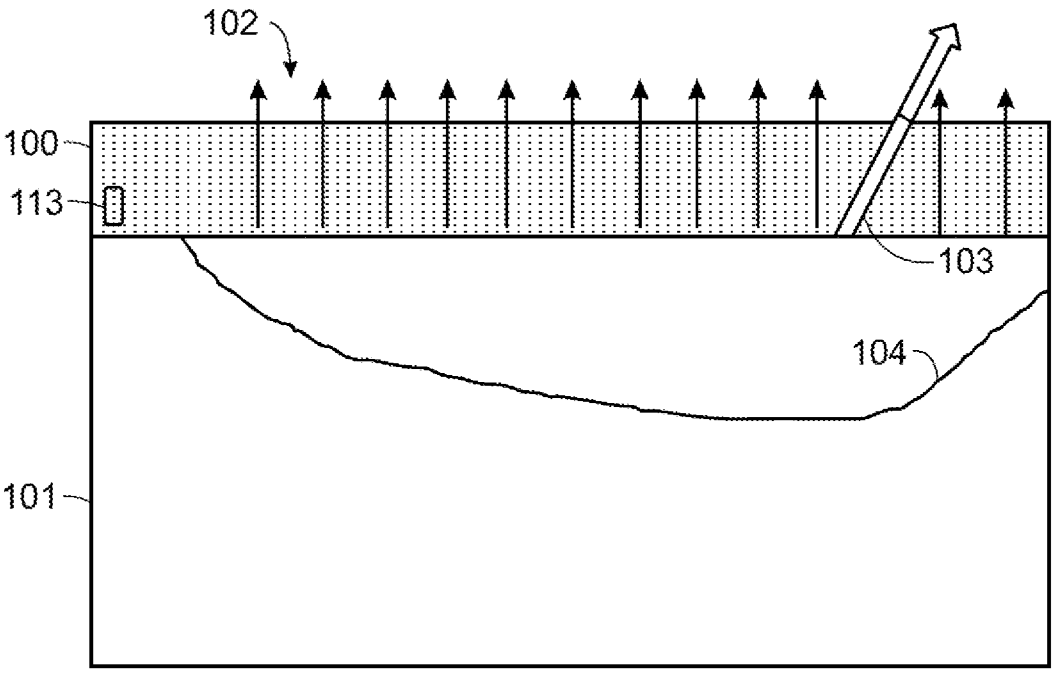
FIG. 1 is a side view of an example caprock of a saline aquifer and potential leakage pathways along which $CO_2$ gas may leak out of the aquifer through the caprock.

FIG. 1 illustrates an example caprock 100 of a saline aquifer 101 and potential leakage pathways along which $CO_2$ gas may leak out of the aquifer 101 through the caprock 100. The leakage pathways include area leakage pathways 102 that are spread throughout a cross-sectional area of the caprock 100, as well as one or both of fractures and faults 103 in the caprock 100. In some examples, the area leakage pathways 102 are generated when fluids 104 (e.g., a $CO_2$ plume) stored within the aquifer 101 imbibe into the caprock 100 due to an increase in a pore pressure of the aquifer 101. In some examples, the fractures or faults 103 are generated or reopened due to an increase in the pore pressure of the aquifer 101 resulting from injection of $CO_2$ into the aquifer 101. Both area leakage pathways 102 and fractures and faults 103 can experience significant $CO_2$ leakage from the aquifer 101.

Figure 2:
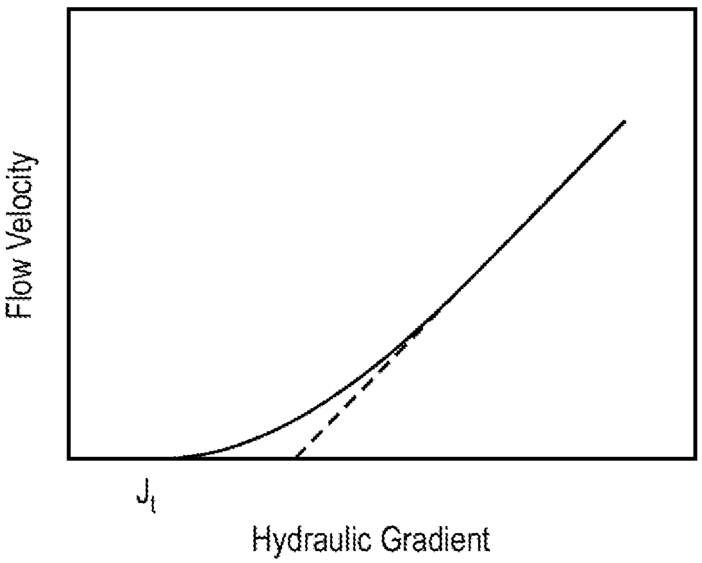
FIG. 2 is a graph showing a brine flow velocity versus a caprock hydraulic gradient for non-Darcy brine flow within the caprock of FIG. 1.

The caprock 100 contains a wetting phase and a non-wetting phase. In some examples, the wetting phase is brine (salt water). In some examples, the non-wetting phase is $CO_2$. Conventionally, area leakage is considered to occur when the difference in caprock pore pressure between the non-wetting and wetting phases along a bottom surface of the caprock 100 exceeds a breakthrough pressure $\Delta p$. The breakthrough pressure is related to a capillary barrier between the non-wetting and wetting phases, as will be discussed later in more detail below. This conventional analysis assumes that vertical brine flow (e.g., upward brine flow resulting from the upward movement of $CO_2$) in the caprock 100 follows Darcy's law, according to which brine flow velocity in the caprock 100 is linearly proportional to a hydraulic gradient within the caprock 100. However, as a result of strong water-solid interactions within tight rocks, brine flow in the caprock 100 will not follow Darcy's law. For example, referring to FIG. 2, brine flow within the caprock 100 will not occur until the hydraulic gradient is larger than a threshold hydraulic gradient $J_t$. This means that the stored fluids 104 may not imbibe into the caprock 100 even though the caprock pore pressure difference has exceeded the breakthrough pressure $\Delta p$.

Accounting for the threshold hydraulic gradient $J_t$ and the associated non-Darcy flow behavior of brine within the caprock 100, according to the disclosure provided herein, allows for a more accurate assessment of an integrity (e.g., a seal integrity) of the caprock 100. An accurate assessment of the caprock integrity is important for carrying out effective, efficient $CO_2$ sequestration at a geological site (e.g., a rock formation). Accordingly, the disclosure provided herein describes novel systems and methods for determining an effective breakthrough pressure $\Delta p_{eff}$ of the caprock 100 by considering the threshold hydraulic gradient $J_t$. Accounting for the threshold hydraulic gradient $J_t$ significantly affects estimation of the effective breakthrough pressure $\Delta p_{eff}$.

Figure 3:
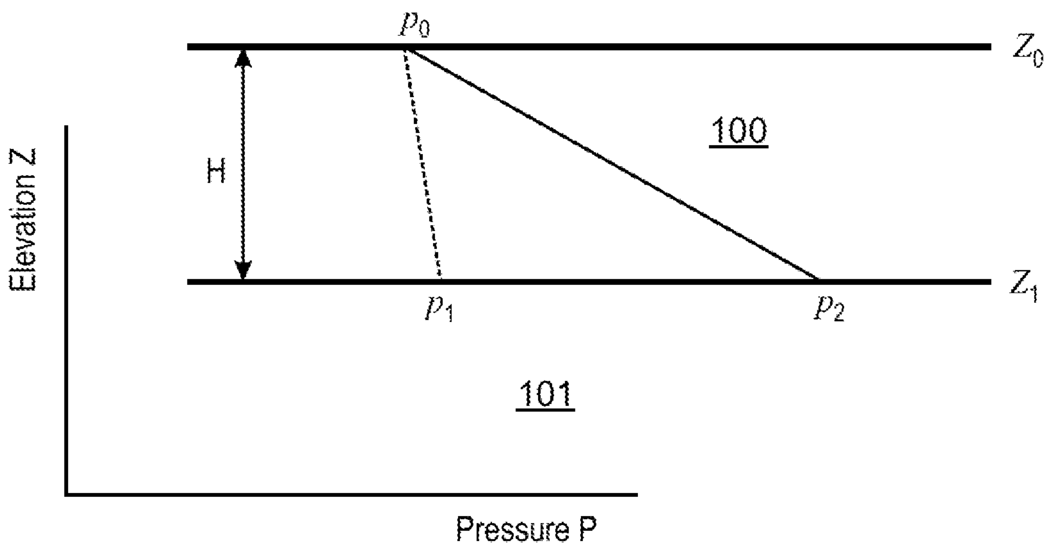
FIG. 3 is a schematic view of an example pressure distribution in the caprock of FIG. 1.

FIG. 3 illustrates an example pressure distribution in the caprock 100. In the example of FIG. 3, the caprock 100 has a thickness H; a top surface of the caprock 100 has an elevation $Z_0$, and the top surface of the caprock 100 has a pore pressure $p_0$. A bottom surface of the caprock 100 (e.g., defining an interface between the caprock 100 and the aquifer 101) has an elevation $Z_1$ and an initial pore pressure $p_1$. Under a hydraulic equilibrium condition, $$p_0+\rho g Z_0=p_1+\rho g Z_1, \tag{1}$$

where $\rho$ is the brine density and g is the gravitational acceleration. Noting $H=Z_0-Z_1$, from Eq. 1.

$$p_1=p_0+\rho g H. \tag{2}$$

For non-Darcy flow, brine will not flow within the caprock 100 until the hydraulic gradient reaches the threshold hydraulic gradient $J_t$, or $$p_2 + \rho g Z_1 = p_0 + \rho g Z_0 + HJ_t. \quad (3)$$

From Eqs. 2 and 3, $$p_2 = p_1 + HJ_t. \quad (4)$$

$p_2$ is the critical brine pressure corresponding to the beginning of $CO_2$ imbibition into the caprock 100 that pushes brine upward in the caprock 100. Specifically, Eq. 4 indicates that for non-Darcy flow, brine starts to flow upward only when brine pressure at a bottom end of the caprock 100 is larger than $p_2$.

Due to the capillary pressure at the bottom end of the caprock 100, the difference between a $CO_2$ pressure in the aquifer $p_s$ and the brine pressure in the caprock 100 is given by $$\Delta p = \frac{2\sigma\cos\theta}{r}, \quad (5)$$

where Δp is the breakthrough pressure, σ the is $CO_2$-brine interfacial tension, θ is the $CO_2$ contact angle in the caprock 100, and r is the radius of the pore threshold (e.g., the narrow pore space connecting pore bodies) in the caprock 100. Thus, for Darcy flow, $CO_2$ imbibition into the caprock 100 occurs when $$p_s \geq p_1 + \Delta p. \quad (6)$$

For non-Darcy flow, $CO_2$ imbibition into the caprock 100 occurs when $$p_s \geq p_2 + \Delta p = p_1 + \Delta p + HJ_t. \quad (7)$$

Eqs. 6 and 7 can be written in a single equation as:

$$p_s \geq p_1 + \Delta p_{eff}, \quad (8)$$

where $\Delta p_{eff}$ is the effective breakthrough pressure for the caprock 100. For Darcy flow, $$\Delta p_{eff} = \Delta p, \quad (9)$$

and for non-Darcy flow.

$$\Delta p_{eff} = \Delta p + HJ_t. \quad (10)$$

As indicated by Eq. 10, the effective breakthrough pressure $\Delta p_{eff}$ for non-Darcy flow, experienced by the caprock 100, depends not only on capillary pressure, but also on the threshold hydraulic gradient $J_t$, and the caprock thickness H.

Conventionally, the impact of non-Darcy flow has not been considered when carrying out $CO_2$ geological sequestration in saline aquifers. Thus, the effective breakthrough pressure $\Delta p_{eff}$ has been significantly underestimated. This underestimation has important implications for the integrity of a caprock and an estimated $CO_2$ storage capacity of a saline aquifer because with non-Darcy flow, a caprock can sustain a much larger increase in pore pressure before $CO_2$ leaks into the caprock.

In an example case of determining the effective breakthrough pressure $\Delta pg_{eff}$ for non-Darcy flow, a measured breakthrough pressure Δp of 2.6 MPa is used (e.g., as an average of a range between 0.1 MPa and 5 MPa), a threshold hydraulic gradient $J_t$ of 0.1 MPa/m is used (e.g., based on measurements of a caprock sample with a permeability of 100 μD); and a caprock thickness H of 100 m is used. Based on these values, the contribution of non-Darcy flow to the effective breakthrough pressure $\Delta p_{eff}$ is $HJ_t$, or 100 m×0.1 MPa/m, which equals 10 MPa. The effective breakthrough pressure $\Delta p_{eff}$ of 10 MPa is significantly larger than the measured breakthrough pressure (e.g., Δp of 2.6 MPa) often observed and owing only to the capillary pressure effect. In other words, non-Darcy flow can sometimes play a more important role in determining a caprock integrity than the capillary-pressure effect.

Accordingly, to accurately determine the integrity of the caprock 100, Eq. 10 is used for determining the effective breakthrough pressure $\Delta p_{eff}$. In some examples, the parameter Δp is estimated from Eq. 5. In other examples, the parameter Δp is measured in the laboratory. In some examples, the caprock thickness H is obtained from geological information of a storage site. In some examples, the threshold hydraulic gradient $J_t$ is measured in the laboratory. Using the values for Δp, H, and $J_t$, the effective breakthrough pressure $\Delta_{peff}$ is calculated with Eq. 10. It is the effective breakthrough pressure $\Delta p_{eff}$, rather than the breakthrough pressure Δp, that should be used for evaluating the seal capability of the caprock 100 (e.g., such as for estimating the maximum pore pressure of the caprock 100 after $CO_2$ has been injected into the aquifer 101, but before $CO_2$ leaks out through the caprock 100).

Figure 4:
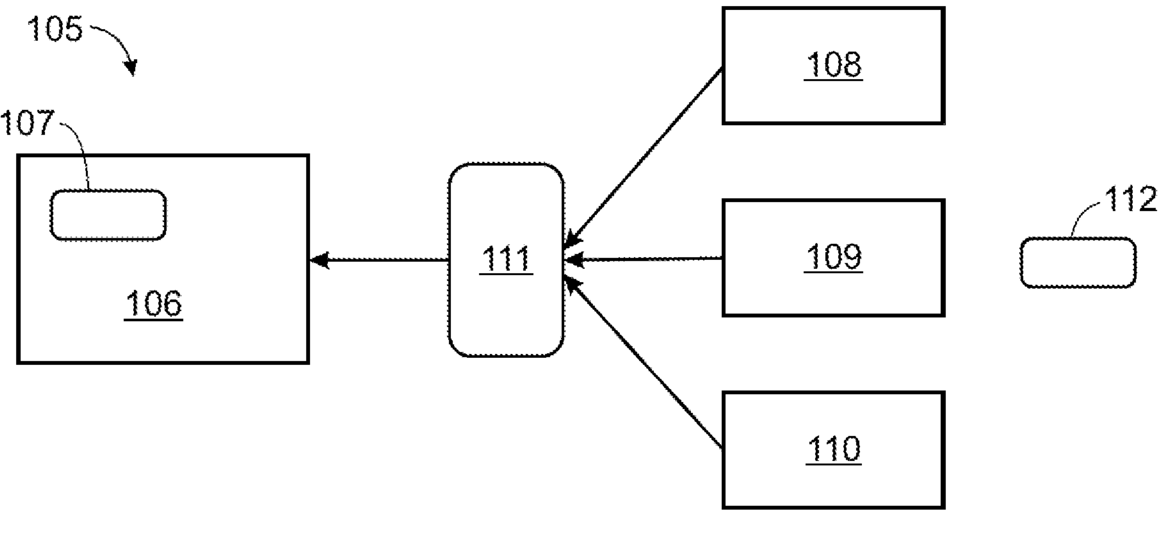
FIG. 4 is a schematic view of an example caprock analysis system by which the caprock of FIG. 1 can be analyzed.

FIG. 4 illustrates a caprock analysis system 105. In some embodiments, the caprock analysis system 105 includes a computing system 106 with one or more hardware processors 107 for calculating parameters in Eqs. 1-10. In some embodiments, the caprock analysis system 105 also includes a laboratory measurement device 108 for measuring the parameter Δp, a field collection device 112 for collecting a sample 113 of the caprock 100 near a bottom end of the caprock 100, a laboratory measurement device 109 for measuring the parameter $J_t$ from the sample 113, a field characterization device 110 for determining the parameter H, and one or more transmission devices 111 for sending data from the devices 108, 109, 110 to the computing system 106.

In some implementations, the field characterization device 110 is operated to determine the caprock thickness H of the caprock 100. In some examples, where the caprock 100 has a variable thickness throughout its cross-section, a spatially averaged caprock thickness may be used for the caprock thickness H. In some implementations, the field collection device 112 is operated to collect the sample 113 of the caprock 100 near the bottom end of the caprock 100.

In some implementations, the laboratory measurement device 109 is operated to determine the threshold hydraulic gradient $J_t$ from the collected sample 113. In some examples, a steady-state flow method is used for estimating the parameter $J_t$. For example, using the steady-state flow method, an upstream pressure and a downstream pressure are fixed, and a flow rate is monitored. After the flow rate becomes constant, the steady-state flow is achieved. The threshold hydraulic gradient $J_t$ is then calculated as the pressure difference between the upstream and downstream pressures of the sample 113, divided by a length of the sample 113. The method is started with a large pressure gradient so that flow rate can be measured. The pressure gradient is then decreased step by step until the flow rate is no longer detectable in the laboratory. At each step, a steady-state flow is achieved. The pressure gradient corresponding to the non-detectable flow rate is the threshold hydraulic gradient $J_t$.

In some implementations, the breakthrough pressure $\Delta p$ is either estimated from Eq. 5 or measured in the laboratory using the laboratory measurement device 108. In some implementations, the effective breakthrough pressure $\Delta p_{eff}$ is calculated via the one or more processors 107 using Eq. 10. In some implementations, a seal integrity of the caprock 100 can be determined using the effective breakthrough pressure $\Delta p_{eff}$. For example, a maximum pore pressure of CO2 injected into the aquifer 101 may be calculated using the effective breakthrough pressure $\Delta p_{eff}$, where such pressure reflects the seal integrity of the caprock 100.

Figure 5:
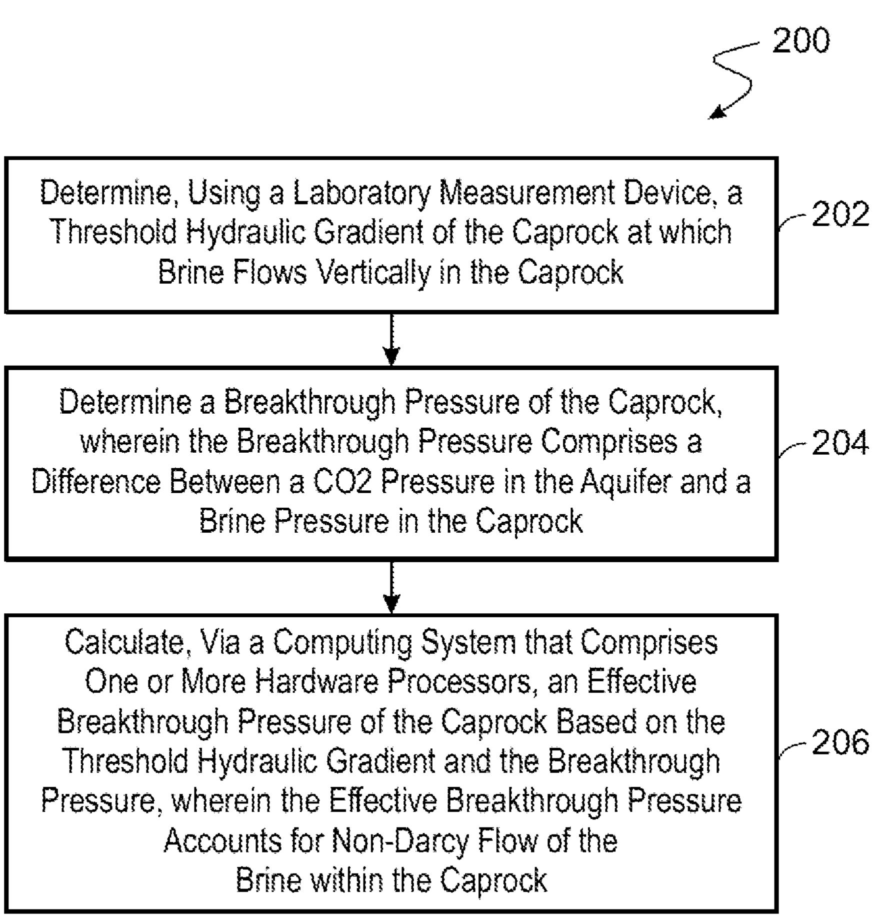
FIG. 5 is a flow chart illustrating an example method of analyzing the caprock of the aquifer of FIG. 1.

FIG. 5 is a flow chart illustrating an example method 200 of analyzing a caprock (e.g., the caprock 100) of an aquifer (e.g., the aquifer 101). In some embodiments, the method 200 includes a step 202 for determining, using a laboratory measurement device (e.g., the laboratory measurement device 109), a threshold hydraulic gradient of the caprock at which brine flows vertically in the caprock. In some embodiments, the method 200 further includes a step 204 for determining a breakthrough pressure of the caprock, wherein the breakthrough pressure is a difference between a $CO_2$ pressure in the aquifer and a brine pressure in the caprock. In some embodiments, the method 200 further includes a step 206 for calculating, via a computing system (e.g., the computing system 106) that includes one or more hardware processors (e.g., the one or more hardware processors 107), an effective breakthrough pressure of the caprock based on the threshold hydraulic gradient and the breakthrough pressure, wherein the effective breakthrough pressure accounts for non-Darcy flow of the brine within the caprock.

Figure 6:
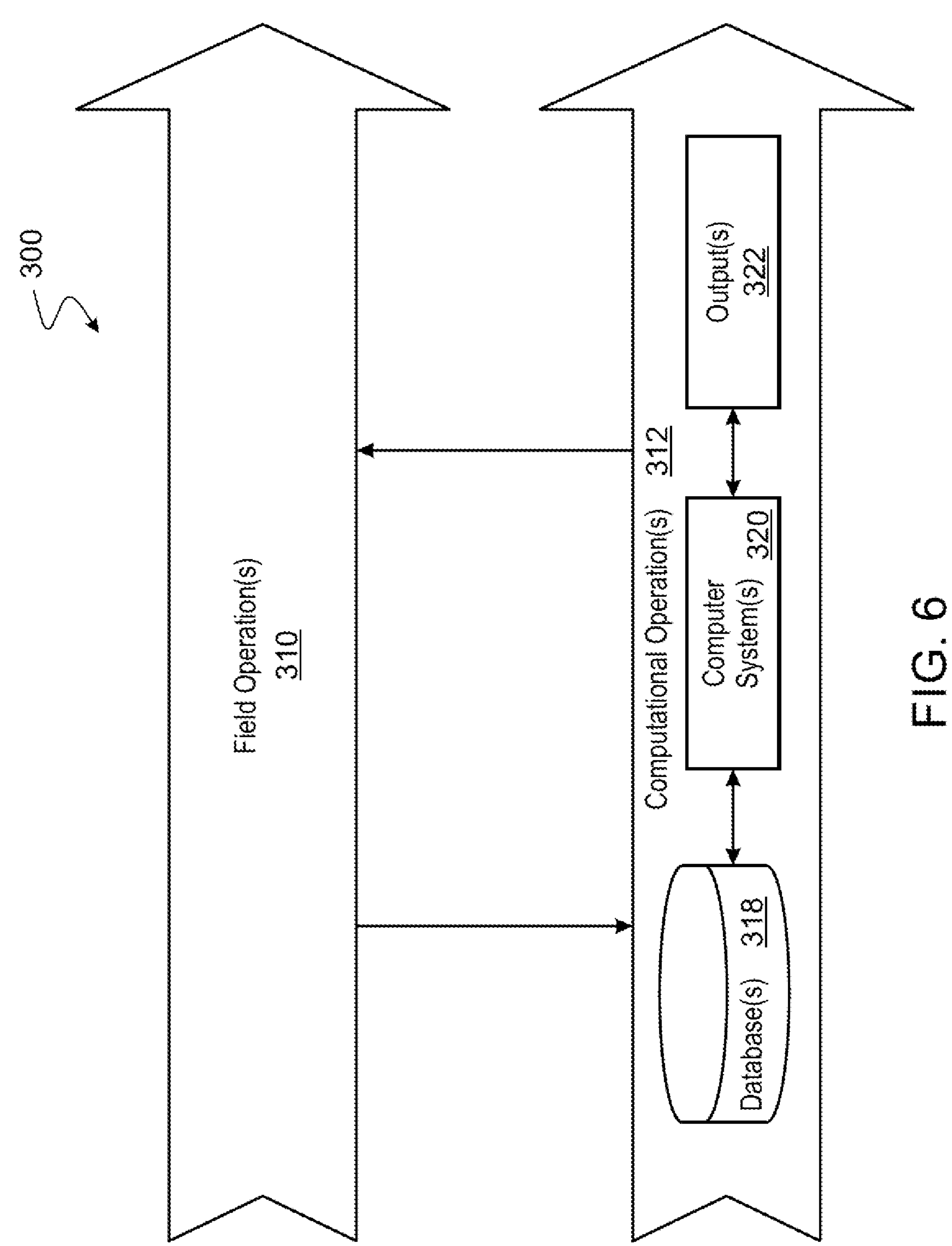
FIG. 6 is a schematic view of $CO_2$ geological sequestration operations that may utilize the caprock analyses envisioned by any of FIGS. 1-5.

FIG. 6 illustrates $CO_2$ geological sequestration operations 300 that include both one or more field operations 310 and one or more computational operations 312, which exchange information and control exploration for the $CO_2$ geological sequestration. In some implementations, the above-discussed caprock analyses may be utilized by or otherwise applied to the $CO_2$ geological sequestration operations 300. In some implementations, outputs of techniques of the present disclosure can be performed before, during, or in combination with the $CO_2$ geological sequestration operations 300, specifically, for example, either as field operations 310 or computational operations 312, or both.

Examples of field operations 310 include forming/drilling a wellbore, hydraulic fracturing, producing through the wellbore, injecting fluids (such as water) through the wellbore, to name a few. In some implementations, methods of the present disclosure can trigger or control the field operations 310. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 310 and responsively triggering the field operations 310 including, for example, generating plans and signals that provide feedback to and control physical components of the field operations 310. Alternatively or in addition, the field operations 310 can trigger the methods of the present disclosure. For example, implementing physical components (including, for example, hardware, such as sensors) deployed in the field operations 310 can generate plans and signals that can be provided as input or feedback (or both) to the methods of the present disclosure Examples of computational operations 312 include one or more computer systems 320 that include one or more processors and computer-readable media (e.g., non-transitory computer-readable media) operatively coupled to the one or more processors to execute computer operations to perform the methods of the present disclosure. The computational operations 312 can be implemented using one or more databases 318, which store data received from the field operations 310 and/or generated internally within the computational operations 312 (e.g., by implementing the methods of the present disclosure) or both. For example, the one or more computer systems 320 process inputs from the field operations 310 to assess conditions in the physical world, the outputs of which are stored in the databases 318. For example, seismic sensors of the field operations 310 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 312 where they are stored in the databases 318 and analyzed by the one or more computer systems 320.

In some implementations, one or more outputs 322 generated by the one or more computer systems 320 can be provided as feedback/input to the field operations 310 (either as direct input or stored in the databases 318). The field operations 310 can use the feedback/input to control physical components used to perform the field operations 310 in the real world.

For example, the computational operations 312 can process the seismic data to generate three-dimensional (3D) maps of the subsurface formation. The computational operations 312 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 312 to process new information about the formation and control the drilling to adjust to the observed conditions in real-time.

The one or more computer systems 320 can update the 3D maps of the subsurface formation as information from one exploration well is received and the computational operations 312 can adjust the location of the next exploration well based on the updated 3D maps. Similarly, the data received from production operations can be used by the computational operations 312 to control components of the production operations. For example, production well and pipeline data can be analyzed to predict slugging in pipelines leading to a refinery and the computational operations 312 can control machine operated valves upstream of the refinery to reduce the likelihood of plant disruptions that run the risk of taking the plant offline.

In some implementations of the computational operations 312, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

While the method 200, system 105, and operations 300 have been described and illustrated with respect to certain dimensions, sizes, shapes, arrangements, materials, orders, and steps, in some embodiments, a method, system, or set of operations that is otherwise substantially similar in construction and/or function to the method 200, system 105, or operations 300 may include one or more different dimensions, sizes, shapes, arrangements, configurations, materials, orders, or steps.

Examples

In an example aspect, a method of analyzing a caprock of an aquifer includes determining, using a laboratory measurement device, a threshold hydraulic gradient of the caprock at which brine flows vertically in the caprock. The method further includes determining a breakthrough pressure of the caprock, wherein the breakthrough pressure reflects a difference between a $CO_2$ pressure in the aquifer and a brine pressure in the caprock. The method further includes calculating, via a computing system that includes one or more hardware processors, an effective breakthrough pressure of the caprock based on the threshold hydraulic gradient and the breakthrough pressure, wherein the effective breakthrough pressure accounts for non-Darcy flow of the brine within the caprock.

Embodiments may provide one or more of the following features.

In an example aspect combinable with any other example aspect, the method further includes determining a thickness of the caprock using a field characterization device, wherein the effective breakthrough pressure is further based on the thickness.

In an example aspect combinable with any other example aspect, the thickness is a spatially averaged thickness.

In an example aspect combinable with any other example aspect, the laboratory measurement device is a first laboratory measurement device, and the breakthrough pressure is measured using a second laboratory measurement device.

In an example aspect combinable with any other example aspect, the breakthrough pressure is calculated, via the computing system, based on a $CO_2$-brine interfacial tension, a $CO_2$ contact angle in the caprock, and a radius of a pore threshold in the caprock.

In an example aspect combinable with any other example aspect, the effective breakthrough pressure is greater than the breakthrough pressure.

In an example aspect combinable with any other example aspect, the method further includes collecting a sample of the caprock from a bottom end region of the caprock.

In an example aspect combinable with any other example aspect, the method further includes estimating the threshold hydraulic gradient using a steady-state flow protocol.

In an example aspect combinable with any other example aspect, the method further includes determining, via the computing system, a seal integrity of the caprock.

In an example aspect combinable with any other example aspect, the method further includes calculating, via the computing system, a maximum pore pressure of $CO_2$ injected into the aquifer.

In another example aspect, a computer-implemented method of analyzing a caprock of an aquifer includes receiving, via a computing system that includes one or more hardware processors, a threshold hydraulic gradient of the caprock at which brine flows vertically in the caprock. The computer-implemented method further includes determining, via the computing system, a breakthrough pressure of the caprock, wherein the breakthrough pressure reflects a difference between a $CO_2$ pressure in the aquifer and a brine pressure in the caprock. The computer-implemented method further includes calculating, via the computing system, an effective breakthrough pressure of the caprock based on the threshold hydraulic gradient and the breakthrough pressure, wherein the effective breakthrough pressure accounts for non-Darcy flow of the brine within the caprock.

Embodiments may provide one or more of the following features.

In an example aspect combinable with any other example aspect, the effective breakthrough pressure is further based on the thickness.

In an example aspect combinable with any other example aspect, determining the breakthrough pressure via the computing system includes receiving the breakthrough pressure.

In an example aspect combinable with any other example aspect, determining the breakthrough pressure via the computing system includes calculating the breakthrough pressure via the computing system.

In an example aspect combinable with any other example aspect, the effective breakthrough pressure is greater than the breakthrough pressure.

In an example aspect combinable with any other example aspect, the computer-implemented method further includes determining, via the computing system, a seal integrity of the caprock.

In another aspect, a caprock analysis system includes a laboratory measurement device for measuring a threshold hydraulic gradient of a caprock at which brine flows vertically in the caprock. The caprock analysis system also includes a device for determining a breakthrough pressure of the caprock, wherein the breakthrough pressure reflects a difference between a $CO_2$ pressure in an aquifer beneath the caprock and a brine pressure in the caprock. The caprock analysis system also includes a computing system for calculating an effective breakthrough pressure of the caprock based on the threshold hydraulic gradient and the breakthrough pressure, wherein the effective breakthrough pressure accounts for non-Darcy flow of the brine within the caprock.

Embodiments may provide one or more of the following features.

In an example aspect combinable with any other example aspect, the caprock analysis system further includes a field characterization device for determining a thickness of the caprock, wherein the effective breakthrough pressure is further based on the thickness.

In an example aspect combinable with any other example aspect, the laboratory measurement device is a first laboratory measurement device, and the device includes a second laboratory measurement device.

In an example aspect combinable with any other example aspect, the device includes one or more hardware processors of the computing system.

Other examples, embodiments, and implementations are within the scope of the following claims.

What is claimed is:

1. A method of analyzing a caprock positioned above an aquifer, the method comprising:

determining, using a laboratory measurement device and according to a steady-state flow protocol, a threshold hydraulic gradient of the caprock at which brine flows vertically in the caprock;

determining a breakthrough pressure of the caprock, wherein the breakthrough pressure comprises a difference between a $CO_2$ pressure in the aquifer and a brine pressure in the caprock;

determining, using a field characterization device, a thickness of the caprock as a difference between a top surface of the caprock and a bottom surface of the caprock that defines an interface between the caprock and the aquifer;

collecting, using a field collection device, a sample of the caprock from a bottom end region of the caprock for analysis; and calculating, via a computing system that comprises one or more hardware processors, an effective breakthrough pressure of the caprock based on the threshold hydraulic gradient and the breakthrough pressure, wherein the effective breakthrough pressure accounts for non-Darcy flow of the brine within the caprock, wherein the breakthrough pressure is calculated, via the computing system, based on a $CO_2$-brine interfacial tension, a $CO_2$ contact angle in the caprock, and a radius of a pore threshold in the caprock.

2. The method of claim 1, wherein the thickness comprises a spatially averaged thickness.

3. The method of claim 1, wherein the laboratory measurement device is a first laboratory measurement device, and wherein the breakthrough pressure is measured using a second laboratory measurement device.

4. The method of claim 1, wherein the effective breakthrough pressure is greater than the breakthrough pressure.

5. The method of claim 1, further comprising estimating the threshold hydraulic gradient using a steady-state flow protocol.

6. The method of claim 1, further comprising determining, via the computing system, a seal integrity of the caprock.

7. The method of claim 6, further comprising calculating, via the computing system, a maximum pore pressure of $CO_2$ injected into the aquifer.

8. A caprock analysis system for analyzing a caprock positioned above an aquifer, the caprock analysis system comprising:

a laboratory measurement device configured to measure, according to a steady-state flow protocol, a threshold hydraulic gradient of the caprock at which brine flows vertically in the caprock;

a device configured to determine a breakthrough pressure of the caprock, wherein the breakthrough pressure comprises a difference between a $CO_2$ pressure in an aquifer beneath the caprock and a brine pressure in the caprock;

a field characterization device configured to determine a thickness of the caprock as a difference between a top surface of the caprock and a bottom surface of the caprock that defines an interface between the caprock and the aquifer;

a field collection device configured to collect a sample of the caprock from a bottom end region of the caprock for analysis; and a computing system operable to calculate an effective breakthrough pressure of the caprock based on the threshold hydraulic gradient and the breakthrough pressure, wherein the effective breakthrough pressure accounts for non-Darcy flow of the brine within the caprock, wherein the device comprises one or more hardware processors of the computing system, and wherein the breakthrough pressure is calculated, via the computing system, based on a $CO_2$-brine interfacial tension, a $CO_2$ contact angle in the caprock, and a radius of a pore threshold in the caprock.

* * * * *